United States Patent
Matsuzawa et al.

(10) Patent No.: US 6,525,801 B1
(45) Date of Patent: Feb. 25, 2003

(54) METHOD AND APPARATUS FOR CONTROLLING MOVING PICTURE SYNTHESIS

(75) Inventors: Tomoko Matsuzawa, Tokyo (JP); Shinji Nojima, Hadano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/889,083

(22) PCT Filed: Nov. 9, 2000

(86) PCT No.: PCT/JP00/07899

§ 371 (c)(1), (2), (4) Date: Jul. 11, 2001

(87) PCT Pub. No.: WO01/37565

PCT Pub. Date: May 25, 2001

(30) Foreign Application Priority Data

Nov. 12, 1999 (JP) ............................................ 11-323333

(51) Int. Cl.[7] ............................ G03B 21/32; H04N 7/14
(52) U.S. Cl. ........................................ 352/40; 348/14.12
(58) Field of Search ........................ 352/40; 348/14.12, 348/14.08, 14.09

(56) References Cited

U.S. PATENT DOCUMENTS 6,300,973 B1 * 10/2001 Feder et al. ............. 348/14.09
6,330,022 B1 * 12/2001 Seligmann ............... 348/14.08

FOREIGN PATENT DOCUMENTS

| JP | 6-6788 | 1/1994 |
|---|---|---|
| JP | 7-79424 | 3/1995 |
| JP | 7-288806 | 10/1995 |
| JP | 9-149396 | 6/1997 |
| JP | 11-18063 | 1/1999 |
| JP | 11-231849 | 8/1999 |
| JP | 11-234644 | 8/1999 |
| JP | 11-243542 | 9/1999 |
| JP | 2000-236539 | 8/2000 |

* cited by examiner

Primary Examiner—Russell Adams
Assistant Examiner—D. Ben Esplin
(74) Attorney, Agent, or Firm—Pearne & Gordon LLP

(57) ABSTRACT

An object of the present invention is to enable to obtain moving picture data of a desired bit rate at a high speed without re-coding when the multi-screen image is generated by synthesizing a plurality of moving picture data.

When a layout designating means (502) designates the arrangement of moving pictures, a bit-rate deciding means (503) instructs a frame-type deciding means (505) to decide a bit rate of the synthesized multi-screen, and a degree-of-importance deciding means (504) decides an assignment rate of the frame rate, the frame-type deciding means (505) decides a frame type of the moving picture data acquired by a data acquiring means (501) and asks a synthesizing means (506) to synthesize the screen. The multi-screen generated by the synthesizing means (506) is streamed onto the network via a data transmitting means (507).

12 Claims, 11 Drawing Sheets

| DataID | 001 | 002 | 003 | 004 |
|---|---|---|---|---|
| X | 0 | 352 | 0 | 352 |
| Y | 0 | 0 | 176 | 176 |
| WIDTH | 352 | 352 | 352 | 352 |
| HEIGHT | 176 | 176 | 176 | 176 |
| SIZE | 100 | 100 | 100 | 100 |
| TYPE | I FRAME | S FRAME | S FRAME | S FRAME |
| EndFlg | TRUE | TRUE | TRUE | FALSE |
| COUNT | 12 | 10 | 11 | 9 |

FIG. 7

| DataID | 001 | 002 | 003 | 004 |
|---|---|---|---|---|
| X | 0 | 352 | 0 | 352 |
| Y | 0 | 0 | 176 | 176 |
| WIDTH | 352 | 352 | 352 | 352 |
| HEIGHT | 176 | 176 | 176 | 176 |
| SIZE | 100 | 100 | 100 | 100 |
| TYPE | I FRAME | S FRAME | S FRAME | S FRAME |
| EndFlg | TRUE | TRUE | TRUE | FALSE |
| WEIGHT | 0.4 | 0.3 | 0.2 | 0.1 |
| Accumu | 1 | 0.6 | 0.4 | 0.2 |

METHOD AND APPARATUS FOR CONTROLLING MOVING PICTURE SYNTHESIS

TECHNICAL FIELD

The present invention relates to a system for synthesizing a plurality of coded moving picture data as a multi-screen and a method thereof and, more particularly, a synthesizing method of getting moving picture data having a bit rate in response to the transmission rate when the synthesized moving picture data are transmitted via a predetermined transmission line.

BACKGROUND ART

In the system such as the TV conference system in which the moving pictures are transmitted, the network band required to transmit the moving pictures is assured by employing the dedicated line such as ISDN (Integrated Services Digital Network). In recent years, the transmission of the moving picture is requested in the environment such as the Internet whose network band is varied. In this case, various situations of the routes connecting the users reside in the Internet, and respective transmission bands are different. If the multi-screen moving pictures employed in the TV conference system are transmitted in real time in such environment, each user must transmits the images at a bit rate, that is smaller than the transmission band, toward the transmission line to which each user is connected. In the prior art, in order to prepare the moving picture data that is fitted to each transmission line, as shown in FIG. 12, there are the method (1) of generating the multi screen by copying the data that are received from the users having the small transmission band, and the method (2) of thinning the data to meet the moving picture of the lowest frame rate for the user having the narrow transmission band. Also, in order to generate the multi screen, there is employed the method of decompressing the moving picture data once and then coding the moving picture data again to meet the network band.

However, there are the problems such that (1) useless data are supplied to the network if the moving picture data are copied and employed, and (2) all images are lowered to the same frame rate by the thinning in the method, that thins the data in unit of frame, even if the video sent from the terminal to the server has the high frame rate. Also, the method (3) of generating the multi screen and transmitting it has the problem such that, since the approach of decompressing the moving picture data once and then coding the moving picture data again is employed to generate the multi screen, it is difficult to generate the multi screen in real time.

The present invention has been made to overcome the above problems, and it is an object of the present invention to enable to obtain moving picture data of a desired bit rate without re-coding when the multi-screen image is generated by synthesizing a plurality of moving picture data.

DISCLOSURE OF THE INVENTION

In order to achieve the above object, in the present invention, when the acquired original data are generated/transmitted as the multi-screen, bit rates of respective original data are adjusted such that they are suppressed within an upper limit of the transmission bit rate. As the adjusting method, a function of deciding the frame type at the time of synthesis is provided to vary the frame rate of the original data in synthesizing the multi-screen, and then a part of the frame is replaced with the frame type having the small data size.

Then, as the method of deciding the frame type, there is the first approach that provides the data X1 for managing temporarily the frame type in synthesis and the data Y1 for managing the number of times/frequency of the frame type (the type in which the size of the original data is assigned as it is, or conversely the type in which the size that is smaller than the size of the original data is assigned) assigned to the original data (video stream of the acquired source) in the synthesis, and then decides the data X1 in the descending order (ascending order) of the data Y1 not to exceed the transmission bit rate.

Accordingly, the frame type of a part of the moving picture in the multi-screen can be decided, and also the multi-screen moving picture can be generated at a desired bit rate in compliance with the data acquiring situation.

Also, there is the second approach that provides the data X2 for managing temporarily the frame type in synthesis, the data Z for managing the degree of importance (priority) among the original data, and the data Y2 for managing the number of times/frequency of the frame type (the type in which the size of the original data is assigned as it is, or conversely the type in which the size that is smaller than the size of the original data is assigned) assigned to the original data in the synthesis as the value calculated based on the value of the data Z, and then decides the data X2 in the descending order (ascending order) of the data Y2 not to exceed the transmission bit rate.

Accordingly, the multi-screen moving picture to which the frame rate decided based on the degree of importance is assigned can be generated at any bit rate.

BRIEF DESCRIPTION OF THE DRAWINGS

FIG. 7 is a view showing a management information store example of the frame-type deciding means in the second embodiment;

In Figures, 101 is a moving picture synthesis controlling system, 102, 103 are a client, 104, 105 are a multi-screen moving picture, 106 is a data storing means, 201 is a data acquiring means, 202 is a layout designating means, 203 is a bit-rate deciding means, 204 is a frame-type deciding means, 205 is a synthesizing means, 206 is a data transmitting means, 501 is a data acquiring means, 502 is a layout designating means, 503 is a bit-rate deciding means, 504 is a degree-of-importance deciding means, 505 is a frame-type deciding means, 506 is a synthesizing means, 507 is a data transmitting means, 901 is a data converting means, 1001 is moving picture data of the synthesized source, 1002 is held data, and 1003 is multi-screen moving picture data.

BEST MODE FOR CARRYING OUT THE INVENTION (Embodiment 1)

A first embodiment of the present invention will be explained with reference to FIGS. 1 to 4 hereinafter.

Figure 1:
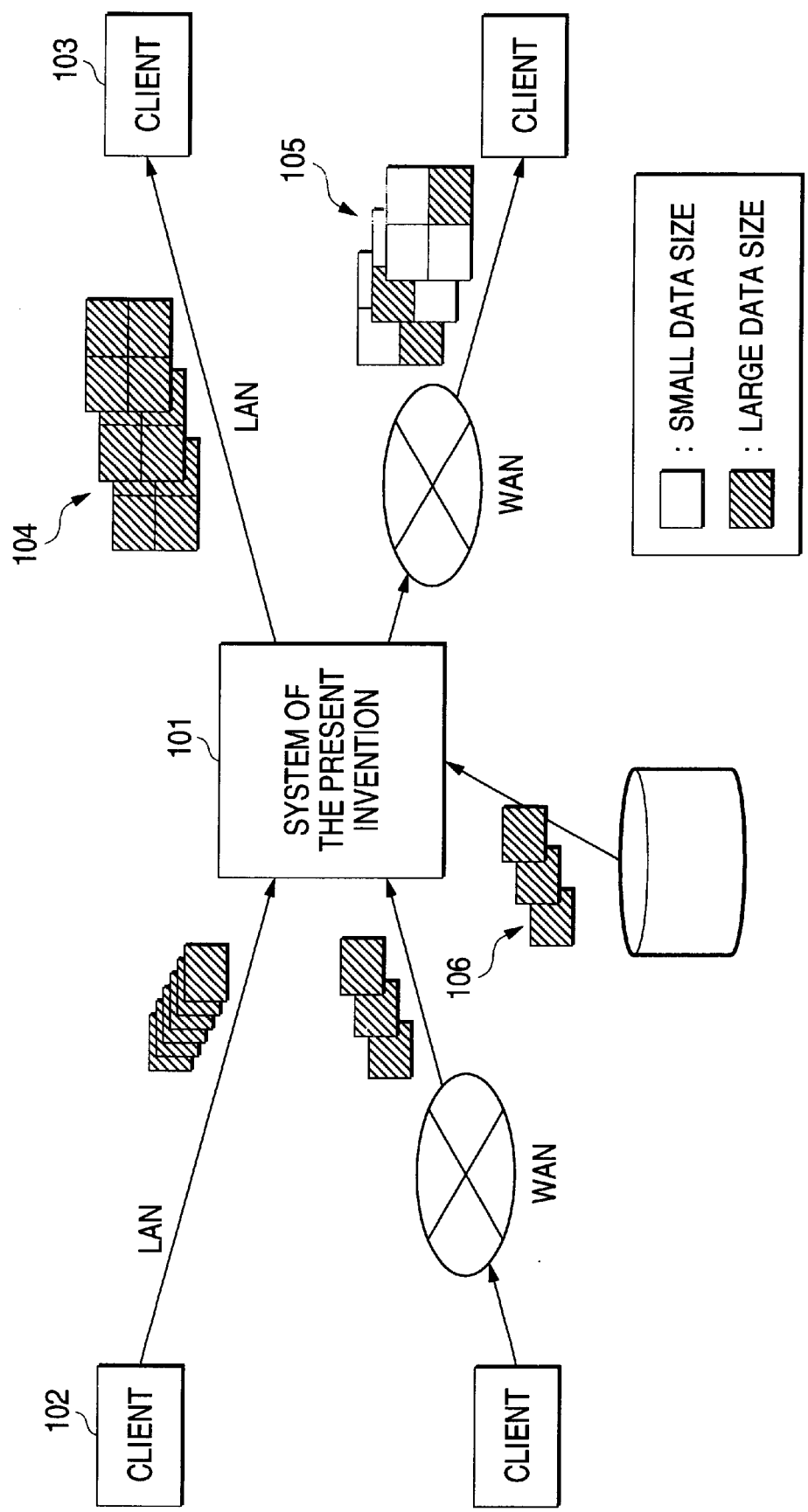
FIG. 1 is a block diagram showing a structural example of a first embodiment of a multi-screen moving picture transmission system, to which the present invention is applied.

FIG. 1 is a block diagram showing a structural example of a first embodiment of a multi-screen moving picture transmission system, to which a moving picture synthesizing system of the present invention is applied. In FIG. 1, 101 is a moving picture synthesis controlling system according to this first embodiment, 102 is a client that sends out the moving picture data to the above moving picture synthesis controlling system 101, 103 is a client that receives the multi-screen moving picture generated by the moving picture synthesis controlling system 101, and 104 and 105 are an example of the multi-screen moving picture generated by the moving picture synthesis controlling system 101 respectively. 106 is a data storing means for accumulating the moving picture data. A large capacity memory means such as the hard disk, the optical disk, DVD (Digital Video Disk), etc. is employed as the data storing means.

The present system generates one multi-screen data by synthesizing a plurality of moving picture data, and also generates the multi-screen by synthesizing the frame type, which has the large data size, like the multi-screen moving picture 104 as it is for the clients 103 that are connected via the high-speed network such as LAN (Local Area Network) In contrast, the present system generates the multi-screen, in which a part of the frame is replaced with the frame type having the small data size, like the multi-screen moving picture 105 for the clients 103 that are connected via the network such as WAN whose bandwidth is narrow. Also, the moving picture data as the synthesized source can be get from not only the network but also the data storing means 106.

Here, under the assumptions that, for example, the moving picture coding system is the system that is based on the International Standard called MPEG, the frame type that is sent out from the client 102 and has the large data size is the intra-coded I picture (I frame), and the frame type that has the small data size is the skip P picture (S frame: the frame same as the preceding frame), embodiments of the present invention will be explained hereunder.

Figure 2:
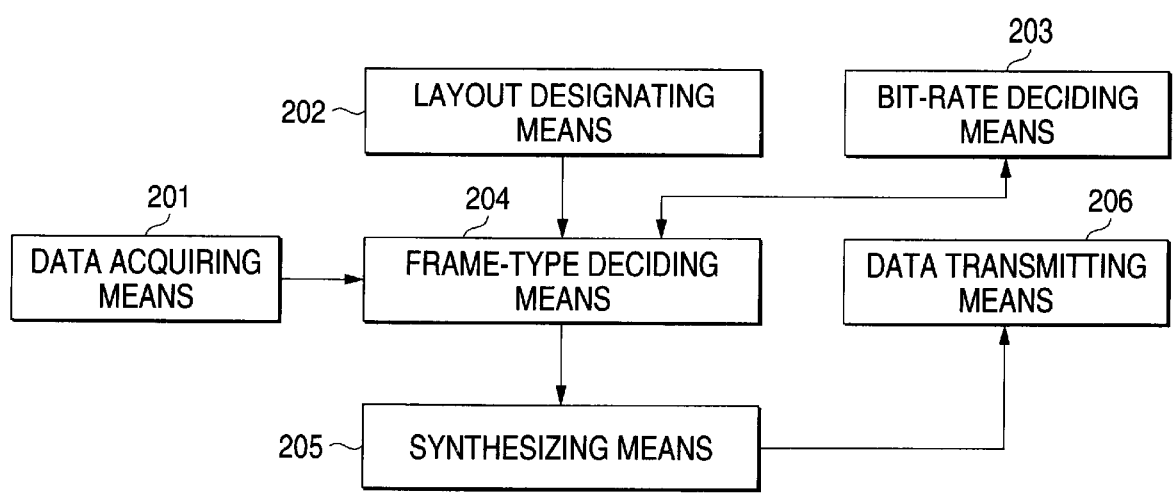
FIG. 2 is a block diagram showing a configuration of a moving picture synthesis controlling system for generating a multi-screen moving picture in the first embodiment.

FIG. 2 is a block diagram showing a configuration of the moving picture synthesis controlling system for generating the multi-screen moving picture in the first embodiment. In FIG. 2, 201 is a data acquiring means for acquiring the moving picture data as the synthesized source, 202 is a layout designating means for deciding an arrangement of the moving picture data, 203 is a bit-rate deciding means for measuring idle bands of the network and deciding the bit rate to be transmitted, 204 is a frame-type deciding means for deciding the frame type to change an assignment rate of the frame rate, 205 is a synthesizing means for synthesizing the video data having the different frame type without the re-coding, and 206 is a data transmitting means for transmitting the synthesized moving picture data.

Also, in FIG. 2, the layout designating means 202 designates the arrangement of the moving picture to the frame-type deciding means 204, and the bit-rate deciding means 203 designates the bit rate of the synthesized multi-screen to the frame-type deciding means 204. Then, the frame-type deciding means 204 decides the frame type of the moving picture data obtained by the data acquiring means 201, and then asks the synthesizing means 205 to synthesize the moving picture data. The multi-screen generated by the synthesizing means 205 is streamed to the network via the data transmitting means 206.

Figure 3:
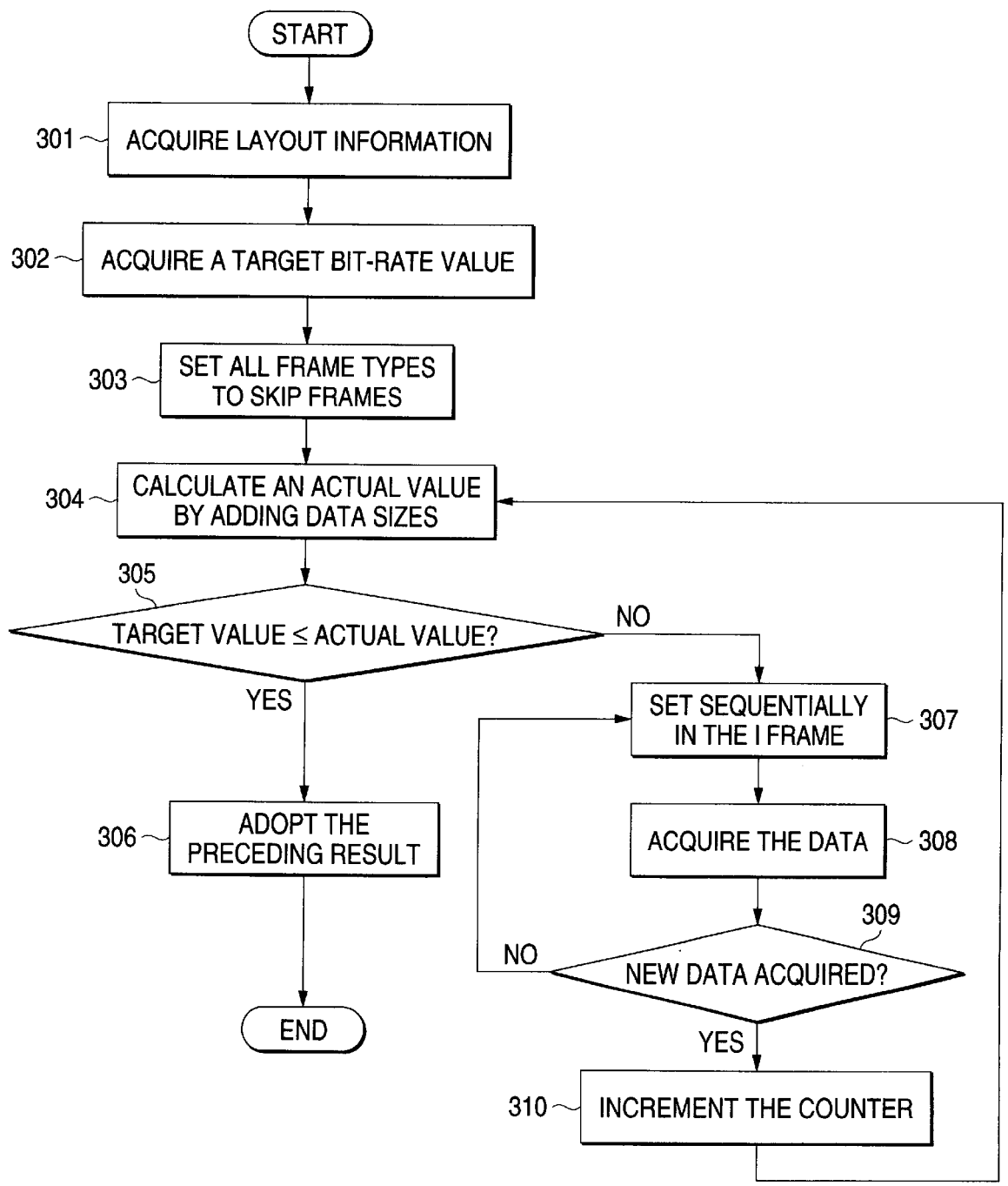
FIG. 3 is a flowchart showing processing operations of a frame-type deciding means in the first embodiment.

An operation of the frame-type deciding means 204 in the moving picture synthesis controlling system constructed as above will be explained with reference to FIGS. 3 and 4 hereunder. FIG. 3 is a flowchart showing processing operations for deciding individual frame types when the frame-type deciding means 204 generates one frame of the multi-screen.

Figures 4, 5:
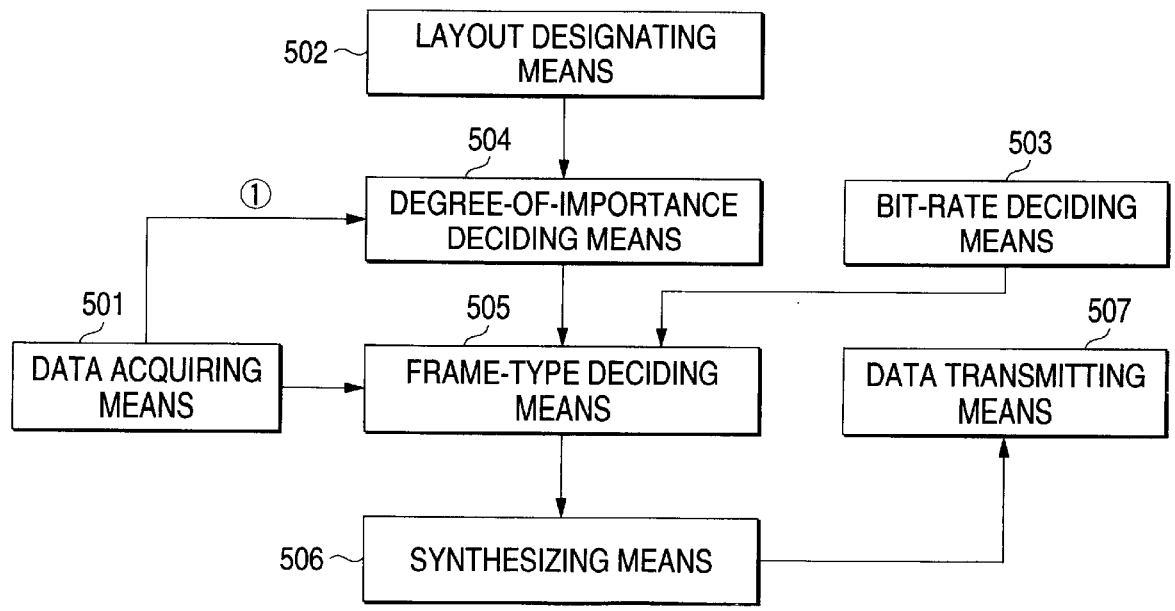
FIG. 4 is a view showing a management information storing example of the frame-type deciding means in the first embodiment.
FIG. 5 is a block diagram showing a configuration of a moving picture synthesis controlling system for generating a multi-screen moving picture according to a second embodiment of the present invention.

FIG. 4 is a flowchart showing an example individual moving picture information managed when the frame-type deciding means 204 decides the frame type. In FIG. 4, a "Data ID" is the number indicating uniquely the video data of the synthesized source. An "X" indicates the X-coordinate along which the moving picture is arranged. A "Y" indicates the Y-coordinate along which the moving picture is arranged. A "Width" indicates the width of the moving picture. A "Height" indicates the height of the moving picture. Units of numerical values of "X", "Y", "Width", and "Height" (e.g., 176, 352, or the like) correspond to the unit employed in the coordinate (e.g., millimeter). A "Size" is the data size of the video data of the synthesized source. The unit of the numerical value ("100" in FIG. 4) of the "Size" is byte. A "Type" indicates the frame type used in the synthesis. An "EndFlg" is the flag indicating whether or not the frame type has been decided. A "Count" is the value indicating the accumulation, i.e., the number times by which the I picture is set.

In FIG. 3, first the layout information for deciding the arrangement position and the size of the moving picture is acquired (step 301), and then the "X", "Y", "Width", and "Height" of the moving picture information are set. Then, a target bit-rate value of the multi-screen to be generated is acquired (step 302). Then, skip frames are set by using all frame types "Type" as initial values (step 303), and the data size as the multi-screen is calculated (step 304). More particularly, (A) the data size of the original data and (B) the longitudinal length (height) and the lateral length (width) of the original data can be known because the original data are acquired, the rough value can be derived based on either the value of (A) if the decided frame type is the I frame or the value of (B) if the decided frame type is the skip frame, and then the data size as the multi-screen can be calculated by adding respective values. Since the frame type is initialized as the skip frame, the initial value is given as a total of respective rough values derived from (B).

The target value of the bit rate obtained from the bit-rate deciding means is compared with the actual value of the data size calculated in step 304 (step 305). If the target value is larger, the frame type "Type" is set to the I picture in the frame having the smallest "Count" (step 307). Then, the data as the synthesized source is acquired (step 308), and then the "Count" is incremented by 1 (step 310). These procedures are repeated until the actual value is in excess of the target value. If the actual value exceeds the target value, the preceding result is adopted (the actual value is returned to the preceding value) (step 306). The multi-screen moving picture can be generated by executing such processes.

The frame-type deciding means 204 has such management information and decides the frame type. In step 308, the data acquiring means 201 acquires the data from the network or the data storing means 106 such as the hard disk, etc. In this case, the new data is not always acquired since the fluctuations are present respectively. Therefore, if the data acquiring means 201 cannot acquire the new data (step 309), the fluctuation can be absorbed by employing the data having the lowest "Count". In other words, the delay in the synthesis of the multi-screen, i.e., the delay of the transmission, can be avoided by interpolating another data (the frame N in the video stream B that can be acquired) into the portion where the data (e.g., the frame M in the video stream A) cannot be acquired.

In the present embodiment, the "Count" is set to mean the number of times by which the I frame is assigned. Conversely, such an approach may be employed that the "Count" is set to mean the number of times by which the S frame is assigned and the frame type "Type" is set to mean the I frame in the original data (video stream) having the largest "Count".

Also, any approach may be employed if the results similar to these approaches can be obtained. For example, such an approach may be employed that the initial value of "Type" is set to the I frame instead of the S frame, the "Count" is set to mean the assigned number of times in the I frame, and the frame type "Type" is set to the original data (video stream) having the smallest "Count" in the S frame. Conversely, an approach may be employed that the "Count" is set to mean the assigned number of times in the S frame, and the frame type "Type" is set to the original data (video stream) having the largest "Count" in the S frame, and others.

In addition, the bit-rate deciding means 203 receives the frame type information decided by the frame-type deciding means 204. Then, the bit-rate deciding means 203 calculates the bit rates of individual moving picture data used actually in the synthesis and decides the bit rate to be designated next. The bit rate is decided such that, when the transmission bit rate is changed, an amount of change in the reception bit rate does not exceed the idle band of the network. For example, in case it is found that the total bit rate of the moving picture data of the synthesized source used in the synthesis is increased by 4 when the transmission bit rate is increased by 1, the idle band can be effectively utilized by instructing the frame-type deciding means 204 to increase the transmission bit rate only by ⅕ of the idle band of the current network. The reason for this is that, since the synthesis bit rate is four times the transmission bit rate, the synthesis bit rate is changed by 4 to cause the change of 5 in total when the transmission bit rate is changed by 1, and thus the transmission/reception bit rates can be fitted to the band if an amount of change in the transmission bit rate can be suppressed within ⅕ of the band. Accordingly, the idle band of the network can be effectively utilized.

As described above, according to the embodiment 1, if the multi-screen is generated by replacing a part of frame type of the moving picture with the skip frame having the small data size, the multi-screen moving picture having any bit rate can be generated.

(Embodiment 2)

A second embodiment of the present invention will be explained with reference to FIGS. 5 to 8 hereinafter. FIG. 5 is a block diagram showing a configuration of a moving picture syntheses is controlling system for synthesizing a multi-screen moving picture according to the second embodiment of the present invention. In FIG. 5, 501 is a data acquiring means for acquiring the moving picture as the synthesized source, 502 is a layout designating means for deciding an arrangement of the moving picture, 503 is a bit-rate deciding means for deciding the transmission bit rate by measuring the idle band of the network, 504 is a degree-of-importance deciding means for deciding the assignment rate of the frame rate, 505 is a frame-type deciding means for deciding the frame type to which the frame rate is assigned in compliance with the degree-of-importance decided by the degree-of-importance deciding means, 506 is a synthesizing means for synthesizing the video data having different frame types, and 507 is a data transmitting means for transmitting the synthesized moving picture data.

In FIG. 5, when the layout designating means 502 designates the arrangement of the moving picture, the bit-rate deciding means 503 instructs the frame-type deciding means 204 to decide the bit rate of the synthesized multi-screen, and the degree-of-importance deciding means 504 decides the assignment rate of the frame rate, the frame-type deciding means 505 decides the frame type of the moving picture data acquired by the data acquiring means 501 and asks the synthesizing means 506 to synthesize the screen. The multi-screen generated by the synthesizing means 506 is streamed onto the network via the data transmitting means 507.

Figure 6:
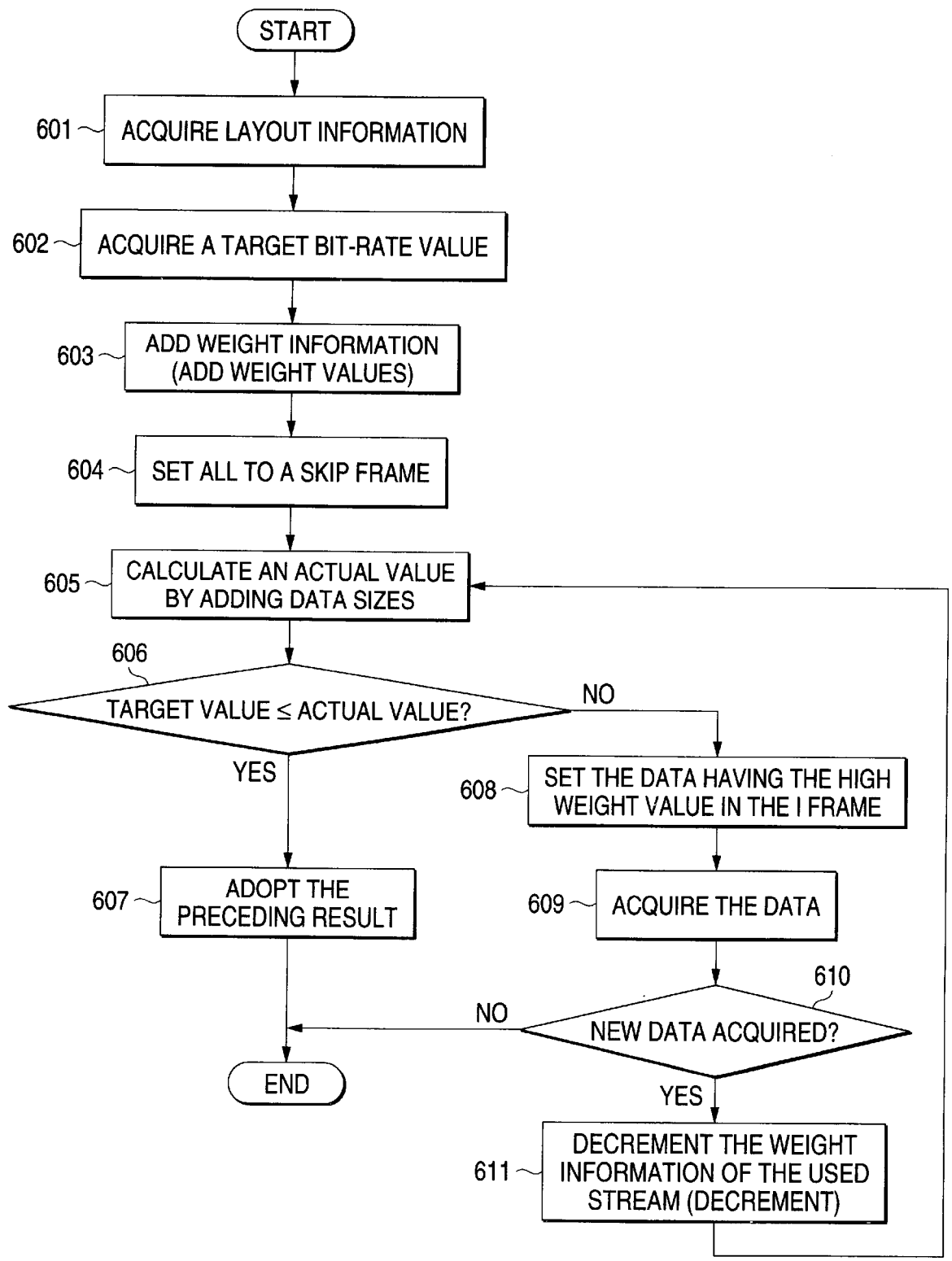
FIG. 6 is a flowchart showing processing operations of a frame-type deciding means in the second embodiment.

An operation of the frame-type deciding means 505 in the moving picture synthesis controlling system constructed as above will be explained with reference to FIGS. 6 and 7 hereunder. FIG. 6 is a flowchart showing processing operations for deciding individual frame types when the frame-type deciding means 505 generates one frame of the multi-screen.

FIG. 7 is a view showing an example of individual moving picture information managed when the frame-type deciding means 505 decides the frame type. In FIG. 7, the "Data ID" is the number indicating uniquely the video data of the synthesized source. The "X" indicates the X-coordinate along which the moving picture is arranged. The "Y" indicates the Y-coordinate along which the moving picture is arranged. The "Width" indicates the width of the moving picture. The "Height" indicates the height of the moving picture. Units of numerical values of "X", "Y", "Width", and "Height" correspond to the unit employed in the coordinate (e.g., millimeter), like FIG. 4. The "Size" is the data size of the video data of the synthesized source. The unit of the numerical value of the "Size" is byte. The "Type" indicates the frame type used in the synthesis. The "EndFlg" is the flag indicating whether or not the frame type has been decided. A "Weight" is the weight value indicating the assignment rate of the frame. An "Accumu" is the accumulation of the weight value.

In FIG. 6, first the layout information for deciding the arrangement position and the size of the moving picture is acquired (step 601), and then the "X", "Y", "Width", and "Height" of the moving picture information are set. Then, the target bit-rate value of the multi-screen to be generated is acquired (step 602). Then, the degree-of-importance information is acquired from the degree-of-importance deciding means 504 and is set in the "Weight" (step 603). Then, skip frames are set by using all frame types "Type" as initial values (step 604), and the data size as the multi-screen is calculated as in step 304 (step 605). The target value of the bit rate obtained from the bit-rate deciding means is compared with the actual value of the data size calculated in step 605 (step 606). If the target value is larger, the frame type "Type" is set to the I picture in the frame having the largest "Accumu" (step 608). Then, the data as the synthesized source is acquired (step 609) and then the "Accumu" of the used stream is decremented (step 611). These procedures are repeated until the actual value is in excess of the target value. If the actual value exceeds the target value, the preceding result is adopted (step 607). The frame type deciding means has such management information and decides the frame type. In step 609, if the new data is not acquired, the decision of the frame type of the frame is ended.

For example, the degree of importance is calculated from the layout information by assuming the center portion of the multi-screen as the important portion. In addition, the degree of importance may be calculated by assuming the large screen as the important portion based on individual sizes of the multi-screens. Also, the degree of importance may be calculated by assuming the data, which has the high variation rate of the data size, out of the data flow ① from the data acquiring means 501 to the degree-of-importance deciding means 504 in FIG. 5 as the important portion, based on the data size information acquired by the data acquiring means 501. Also, the degree of importance may be decided by inputting the instruction from the user into the degree-of-importance deciding means 505 as the command data.

Figure 8:
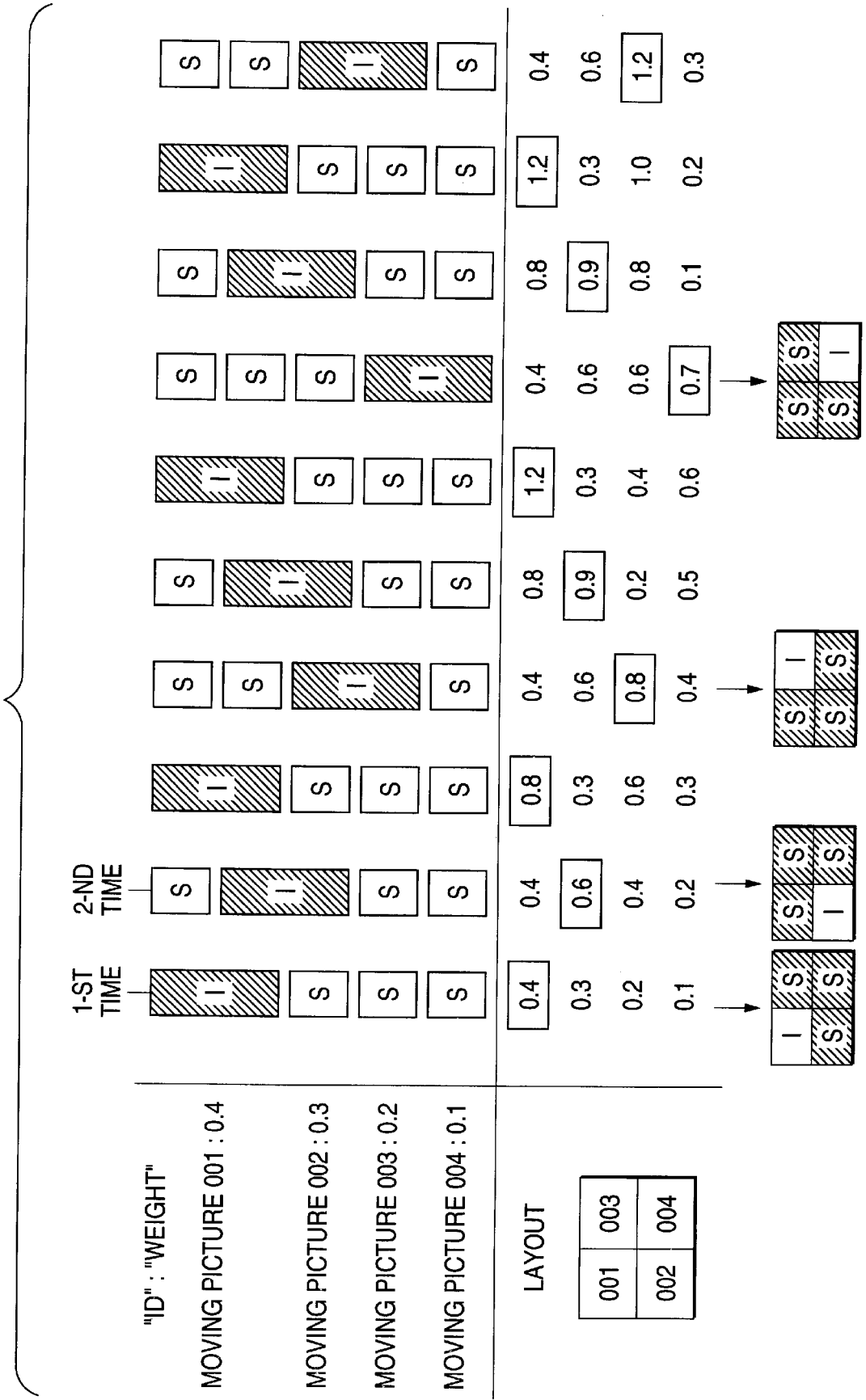
FIG. 8 is a view showing an example of weight-value calculation by the frame-type deciding means in the second embodiment.

Next, relationships between the degree of importance "Weight" and the accumulated values "Accumu" of the degree of importance are shown in FIG. 8. FIG. 8 is a view showing an example of weight-value calculation in the second embodiment when the frame-type deciding means assigns the frame rates to four moving picture data shown in FIG. 7 such that their degrees of importance are set to 4:3:2:1 respectively. In this second embodiment, as an example, the "Weight" of the moving picture is set to 0.4, 0.3, 0.2, 0.1 respectively.

In this example, assume that the data size of one sheet I picture of respective moving picture data is equal and the bit rate at which only a sheet of I picture is selected is designated. In step 603 in FIG. 6, the "Accumu" is set to 0.4, 0.3, 0.2, 0.1 respectively. Since merely one data size is selected from the upper "Accumu" value, the moving picture 001 is set in the I picture and the "Accumu" value of the moving picture 001 is reset to 0 (step 611), the first frame is ended. In the second frame, the "Weight" value acquired in step 603 is added, and thus the "Accumu" value is set to 0.4, 0.6, 0.4, 0.2 respectively. The moving picture 002 having the highest "Accumu" value is selected as one upper value, only the moving picture 002 is set in the I picture and the "Accumu" value is reset to 0 (step 611).

As can be seen from FIG. 8, the assignment frequency of the I frame to the layout 001 having the high degree of importance is high, whereas the I frame is assigned to the layout 004 having the low degree of importance not to generate the image, that is not changed at all, out of the transmitted multi-screen images although the assignment frequency of the I frame is low. That is, the assignment frequency of the I frame is adjusted in response to the degree of importance.

In this case, the example shown in FIG. 8 illustrates the example in the case where the data sizes of individual moving pictures are equal and the transmission bit rate at which only one size can be selected is designated. For this reason, only one I picture is set in respective multi-screens in the example in FIG. 8. Actually, since the size of the I picture is varied, the situation that two moving pictures are set in the I picture or no moving picture is set in the I picture can be generated. Also, a sheet of moving picture in which the I picture and the skip P picture are present mixedly is treated as the P picture as the MPEG format. In addition, although the explanation of the multi-screen moving pictures equivalent to above FIG. 8 (second embodiment) is not given in the above first embodiment, the multi-screen moving pictures can be generated in the same manner in the first embodiment. However, in the case of the first embodiment, since the assignment of the frame rate is set based on not the "Weight" value but the "Count" value, the moving picture which is simply incremented by 1 if it is set as the I picture and which has the lowest "Count" value is selected.

Further, various combinations may be considered like the case of the "Count" value in the embodiment 1 such that the initial value of "Type" is set in the I frame or the S frame, the accumulation or degression of the "Accumu" is adopted in response to the above, the setting of the "Type" (decision of the frame type) is executed in the descending order or the ascending order of the "Accumu" in response to the above, etc. Any approaches may be employed in the present embodiment.

As described above, according to the present embodiment, the multi-screen moving picture having any bit rate, to which the frame rate is assigned in accordance with the degree of important, can be generated. In particular, in the present method, the situation that the synthesis of the original data (the S frame assignment) is executed in the state that such data is not changed at all can be avoided, while maintaining the high assignment rate of the I frame to the original data (video stream of the acquired source) having the high degree of importance during the synthesis. Therefore, its practical effect is significant.

(Embodiment 3)

Figure 9:
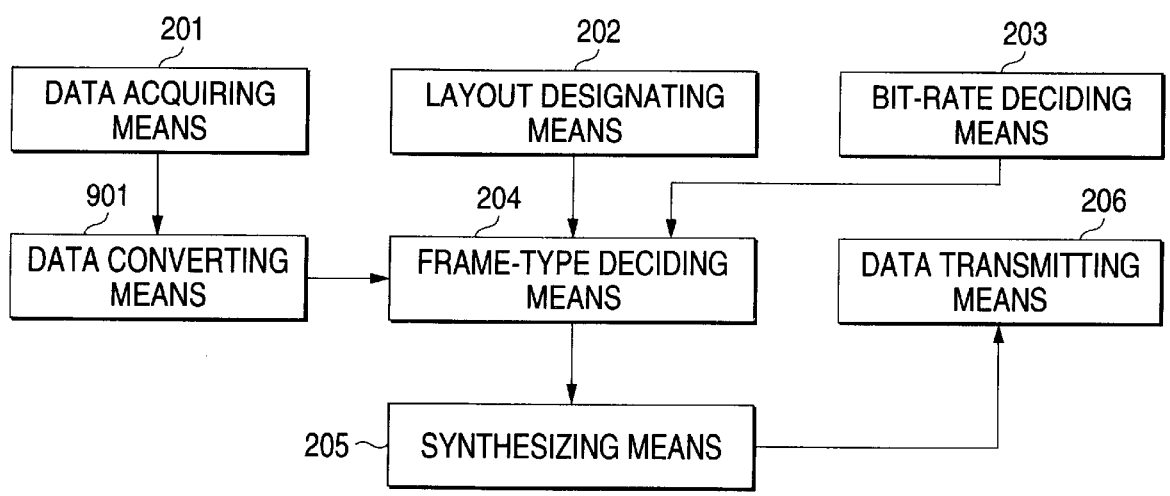
FIG. 9 is a block diagram showing a configuration of a moving picture synthesis controlling system for generating a multi-screen moving picture according to a third embodiment of the present invention.
Figure 10:
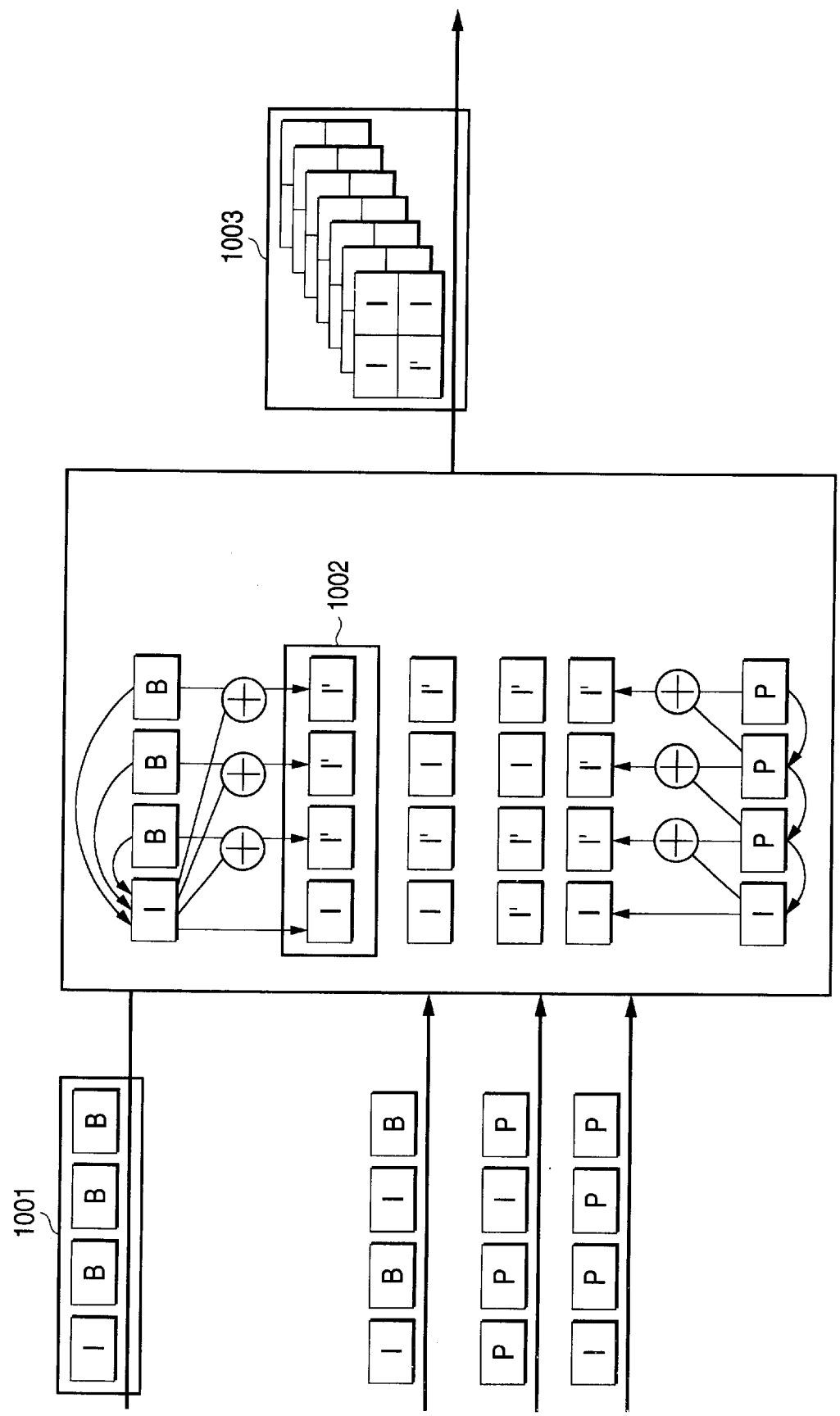
FIG. 10 is a view showing a processing operation example of a data converting means in the third embodiment.
Figure 11:
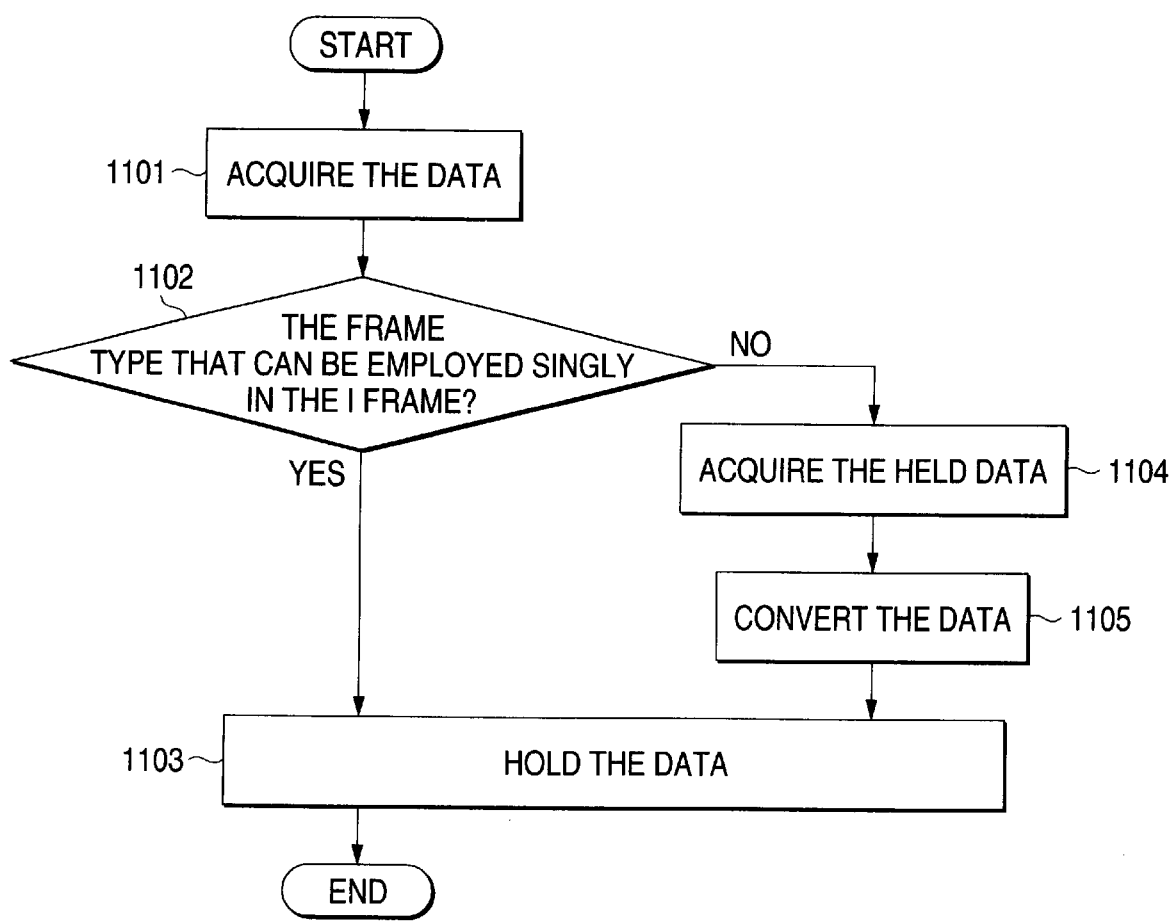
FIG. 11 is a flowchart showing processing operations of a data converting means in the third embodiment.
Figure 12:
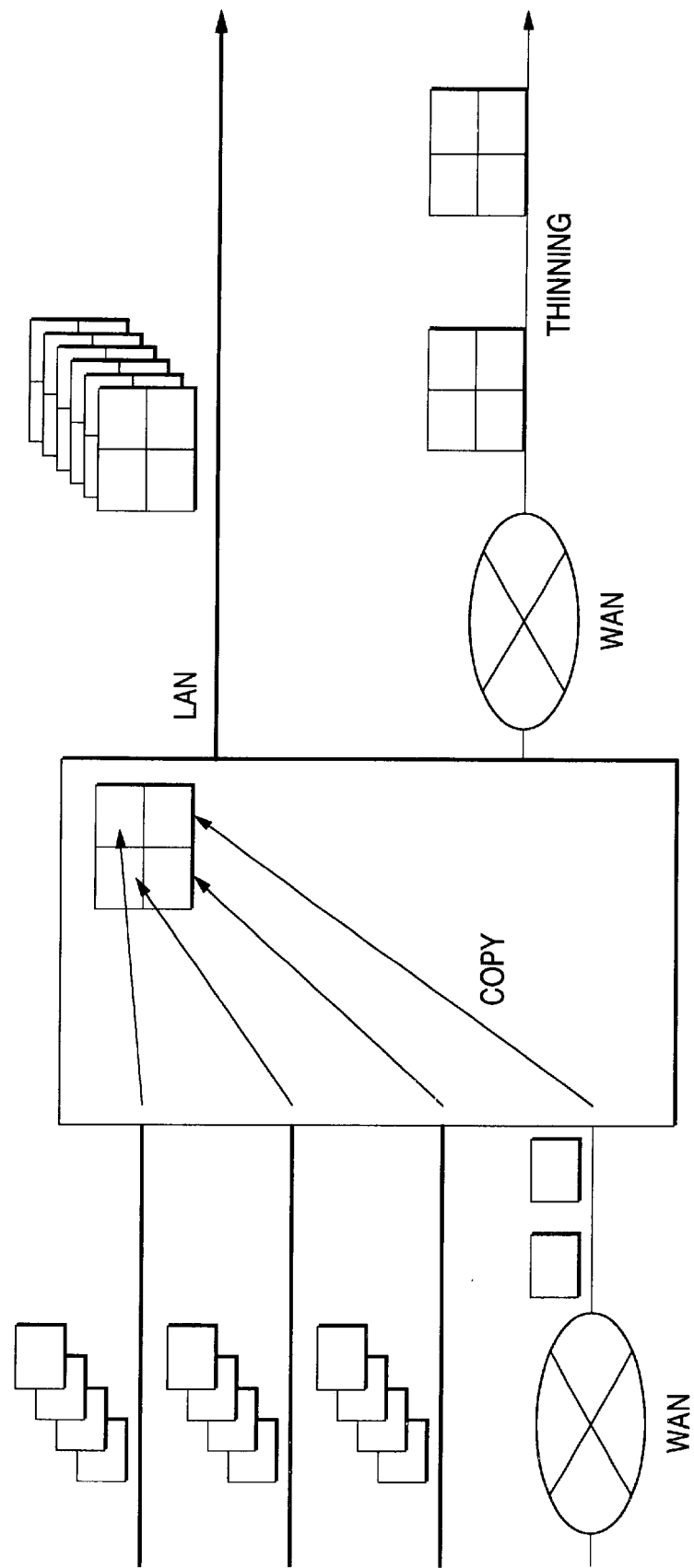
FIG. 12 is a view showing an example of a moving picture synthesis controlling system in the prior art.

FIGS. 9 to 11 are views showing a third embodiment of the present invention. FIG. 9 is a block diagram showing a configuration of the moving picture synthesis controlling system for generating the multi-screen moving picture according to the third embodiment of the present invention. FIG. 10 is a view showing an example of the data obtained by a processing operation of the data converting means in the third embodiment. FIG. 11 is a flowchart showing data conversion processing operations of the data converting means in the third embodiment.

In FIG. 9, 201 is a data acquiring means for acquiring the moving picture as the synthesized source, 901 is a data converting means for converting the acquired data as the data that can always be utilized and holding it, 202 is a layout designating means for deciding the arrangement of the moving picture data, 203 is a bit-rate deciding means for deciding the transmitted bit rate, 204 is a frame-type deciding means for deciding the frame type, 205 is a synthesizing means for synthesizing the video data having the different frame types, and 206 is a data transmitting means for transmitting the synthesized moving picture data.

In FIG. 9, when the layout designating means 202 designates the arrangement of the moving picture, the bit-rate deciding means 203 instructs the frame-type deciding means 205 to decide the bit rate of the synthesized multi-screen, and the degree-of-importance deciding means 204 decides the assignment rate of the frame rate, the frame-type deciding means 205 decides the frame type of the moving picture data that are acquired by the data acquiring means 501 and then converted by the data converting means 901, and then asks the synthesizing means 206 to synthesize the screen. The multi-screen generated by the synthesizing means 206 is streamed onto the network via the data transmitting means 507.

The data acquiring means 201, the layout designating means 202, the bit-rate deciding means 203, the frame-type deciding means 204, the synthesizing means 205, and the data transmitting means 206 are operated in the similar to the first embodiment. Here the data converting operation of the data converting means 901 will be explained with reference to FIG. 10 and FIG. 11.

In FIG. 10, 1001 is moving picture data as the synthesized source acquired by the data acquiring means, 1002 is data that is converted from the data 1001 by the data converting means 901 and is held, and 1003 is multi-screen moving picture data that are output by the present system.

In the processing operation of the data converting means 901 shown in FIG. 11, the data converting means 901 acquires the data from the data acquiring means 501 (step 1101). It is decided whether or not the acquired data is the data that can be employed singly in one frame (step 1102). If the acquired data can be employed singly in one frame, the data is held (step 1103). If the acquired data is the data that cannot be employed singly in one frame, the held data is acquired (step 1104) and then such data is converted into the data that cannot be employed singly (step 1105). Then, the data is held (step 1103). The data being held until now is cancelled.

Here, the explanation will be made with reference to FIG. 10 hereunder under the assumptions that, for example, the moving picture coding system is the system that is based on the International Standard called MPEG, the frame type that can be used singly in one frame is the I picture which is subjected to the intra coding, and the frame type that cannot be used singly in one frame is the P picture or the B picture which is subjected to the forward prediction coding.

In FIG. 10, if the acquired data is the I picture that can be used singly in one frame, the data converting means 901 holds such data. If the acquired data is the B picture which is subjected to the forward prediction coding, the data converting means 901 converts such data into the I picture that can be used singly (I' picture) by adding the held I picture and the B picture, holds the data, and then cancels the data being held until now.

Similarly, if the acquired moving picture data is the I picture that can be used singly, the data converting means 901 holds the data. If the acquired data is the P picture which is subjected to the forward prediction coding, the data converting means 901 converts such data into the I picture that can be used singly (I' picture) by adding the held picture and the P picture, and then holds the data again.

Accordingly, the frame-type deciding means 505 can handle all moving pictures as the synthesized source in the same way as the I picture, can decide the frame type of the I picture and the skip P picture, and can generate the multi-screen moving picture at any bit rate. In this case, the embodiment 1, the embodiment 2, and the embodiment 3, the data format of the moving picture is explained as the type that is based on the MPEG standard. But the present invention is not limited to the MPEG format.

<Industrial Applicability>

As described above, according to the present invention, the frame type of a part of the moving picture in the multi-screen can be decided, and the frame type deciding means can decide the frame type according to the data acquiring situation, and therefore the multi-screen moving picture can be generated at any bit rate.

Also, the multi-screen moving picture whose bit rate is re-decided can be generated based on the frame type decided by the frame type deciding means.

In addition, the frame type can be decided in accordance with the degree of importance of individual moving picture data, and also the multi-screen moving picture can be generated at any bit rate.

Further, in the case that the moving picture as the synthesized source has the data characteristic that cannot be used singly in one frame, the multi-screen moving picture can be generated at any bit rate by using any frame if the data converting means converts the data into the moving picture data that can be used singly in one frame.

What is claimed is:

1. A moving picture synthesis controlling system comprising:

data acquiring means for acquiring a plurality of moving picture data as synthesized sources;

layout designating means for designating a layout to make it possible to arrange the acquired moving picture data in a multi-screen;

bit rate deciding means for deciding a bit rate at which moving pictures in the multi-screen are transmitted;

frame-type deciding means for deciding a frame type of the acquired moving picture data;

synthesizing means for synthesizing the acquired moving picture data based on the decided frame type; and data transmitting means for transmitting the synthesized moving picture data.

2. A moving picture synthesis controlling system according to claim 1, further comprising:

degree-of-importance deciding means for deciding an assignment rate of a frame rate individually for the moving picture data as the synthesized sources;

wherein the frame-type deciding means decides the frame type in accordance with a degree of importance decided by the degree-of-importance deciding means.

3. A moving picture synthesis controlling system according to claim 2, wherein the degree-of-importance deciding means decides the degree of importance based on position information that arranges individual moving picture data acquired from the layout designating means.

4. A moving picture synthesis controlling system according to claim 2, wherein the degree-of-importance deciding means decides the degree of importance based on display sizes of individual moving picture data acquired from the layout designating means.

5. A moving picture synthesis controlling system according to claim 2, wherein the degree-of-importance deciding means decides the degree of importance based on variation rates of individual moving picture data sizes acquired from the data acquiring means.

6. A moving picture synthesis controlling system according to claim 2, wherein the degree-of-importance deciding means decides the degree of importance based on a priority instruction issued from a user.

7. A moving picture synthesis controlling system according to claim 1, wherein the frame-type deciding means decides again the frame type for another moving picture data as the synthesized source if the data acquiring means fails to acquire new moving picture data as the synthesized source, and the synthesizing means arranges the data, the frame type of which is decided, in arranging locations of the moving picture data that are not acquired as the synthesized source, whereby a multi-screen moving picture is generated.

8. A moving picture synthesis controlling system according to claim 1, further comprising:

data converting means for converting the acquired data into data, that can be used singly, to hold it if the data acquired by the data acquiring means is the moving picture data that can be used singly in one frame;

wherein the synthesizing means executes a synthesis by using the converted moving picture data.

9. A moving picture synthesis controlling system for acquiring a plurality of moving picture data as synthesized sources and then generating/transmitting these data as a multi-screen moving picture, wherein management information files, each of which contains frame type management data indicating temporarily a frame type in synthesis, and type assignment management data indicating a number of times/frequency of the frame type assigned actually in synthesis, are held for each of the moving picture data as the synthesized sources, and the frame type management data are updated based on the type assignment management data not to exceed a transmission bit rate, and the moving picture data as synthesized sources are generated in a multi-screen based on the frame type indicated by the updated frame type management data.

10. A moving picture synthesis controlling system for acquiring a plurality of moving picture data as synthesized sources and then generating/transmitting these data as a multi-screen moving picture, wherein management information files, each of which contains frame type management data indicating temporarily a frame type in synthesis, and degree-of-importance management data indicating degrees of importance of these data, type assignment management data indicating a number of times/frequency of the frame type calculated from the degree-of-importance management data and assigned actually in synthesis, are held for each of the moving picture data as the synthesized sources, and the frame type management data are updated based on the type assignment management data not to exceed a transmission bit rate, and the moving picture data as synthesized sources are generated in a multi-screen based on the frame type indicated by the updated frame type management data.

11. A moving picture synthesis controlling method comprising steps of:

acquiring a plurality of moving picture data as synthesized sources;

designating a layout to make it possible to arrange the acquired moving picture data in a multi-screen;

deciding a target bit rate at which moving pictures in the multi-screen are transmitted;

deciding a frame-type of the acquired moving picture data;

synthesizing the acquired moving picture data based on the decided frame type; and transmitting the synthesized moving picture data; wherein, in the step of deciding the frame type, the frame type of the acquired moving picture data is initialized into a predetermined type frame, then a target value as a target bit rate is compared with an actual value as a data size when the multi-screen is actually generated, and then, if the target value is larger than the actual value, the frame type of the acquired moving picture data is decided in sequence into another type frame different from the predetermined type until the actual value does not exceed the target value.

12. A moving picture synthesis controlling method comprising the steps of:

acquiring a plurality of moving picture data as synthesized sources;

designating a layout to make it possible to arrange the acquired moving picture data in a multi-screen;

deciding a target bit rate at which moving pictures in the multi-screen are transmitted;

deciding a frame-type of the acquired moving picture data;

synthesizing the acquired moving picture data based on the decided frame type; and transmitting the synthesized moving picture data;

wherein, in the step of deciding the frame type, the frame type of the acquired moving picture data is initialized into a predetermined type frame, then a degree of importance that decides an assignment rate of a frame rate individually for the acquired moving picture data is decided, then a target value as a target bit rate is compared with an actual value as a data size when the multi-screen is actually generated, and then, if the target value is larger than the actual value, the frame type of the acquired moving picture data is decided in order of the degree of importance into another type frame different from the predetermined type until the actual value does not exceed the target value.

* * * * *